June 3, 1958
M. E. GREEN
2,837,139
CLAMP FOR HOLDING BRAKE LINING IN POSITION TO BE BONDED TO A BRAKE SHOE
Filed Oct. 22, 1953
2 Sheets-Sheet 1
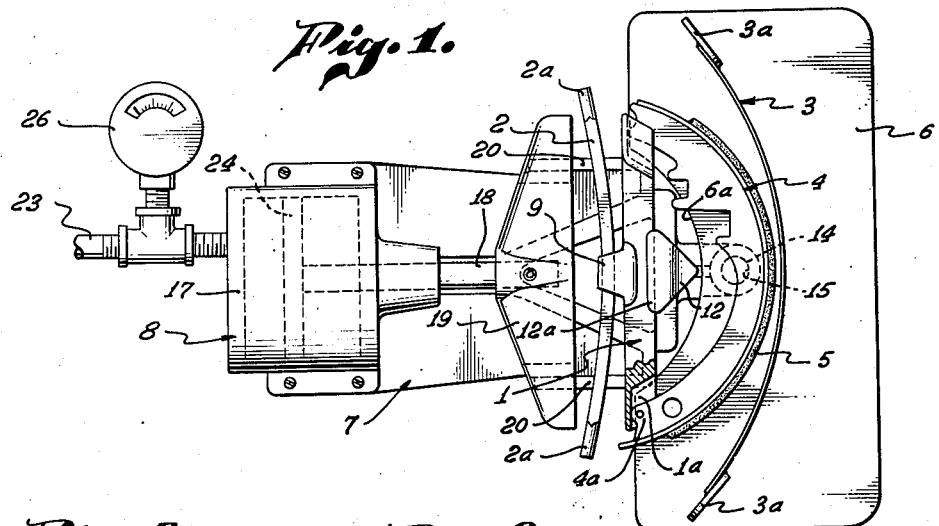
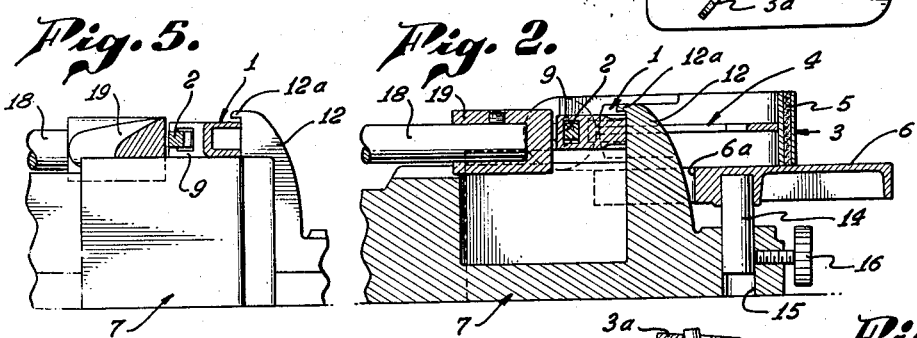
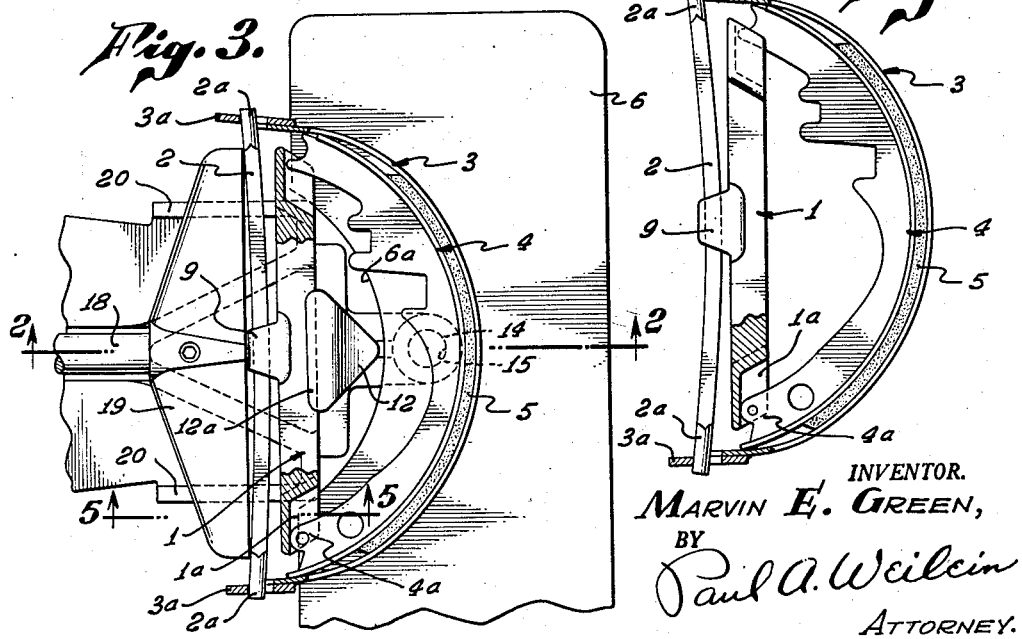
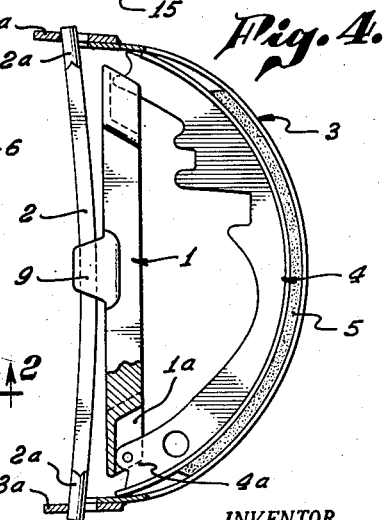
INVENTOR.
MARVIN E. GREEN,
BY
Paul A. Weilein
ATTORNEY.

June 3, 1958 M. E. GREEN 2,837,139
CLAMP FOR HOLDING BRAKE LINING IN POSITION TO BE
BONDED TO A BRAKE SHOE
Filed Oct. 22, 1953 2 Sheets-Sheet 2
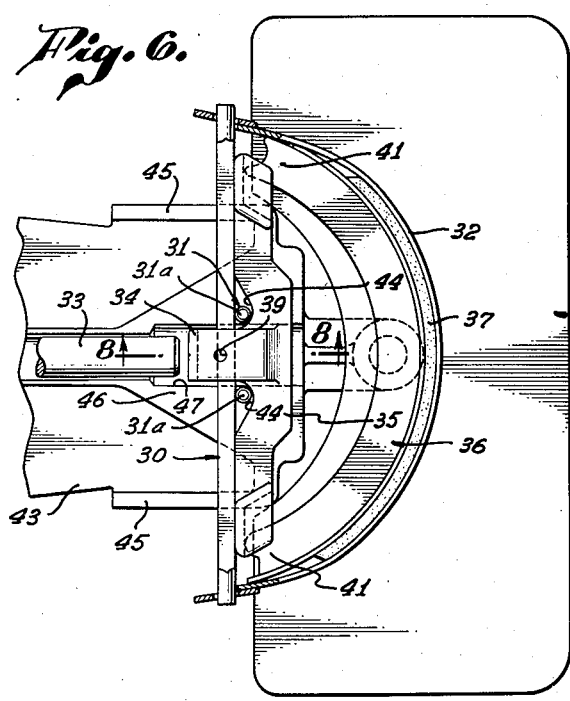
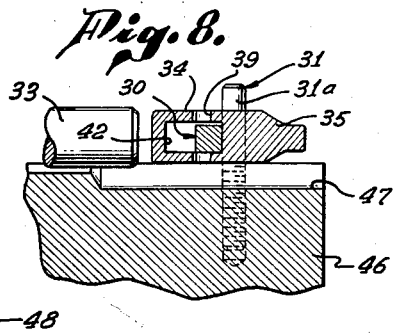
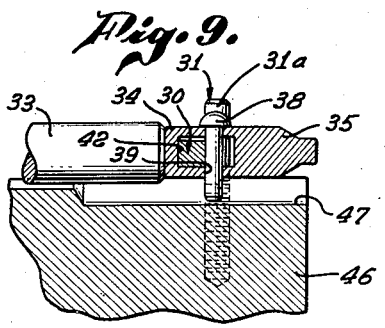
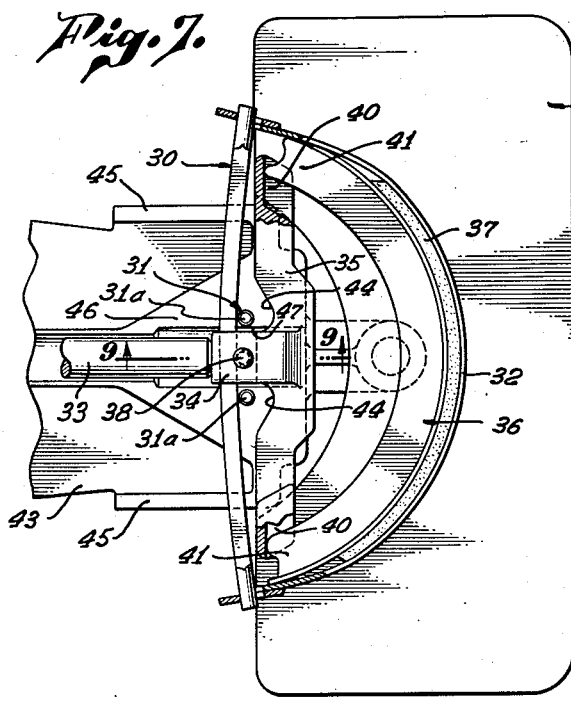
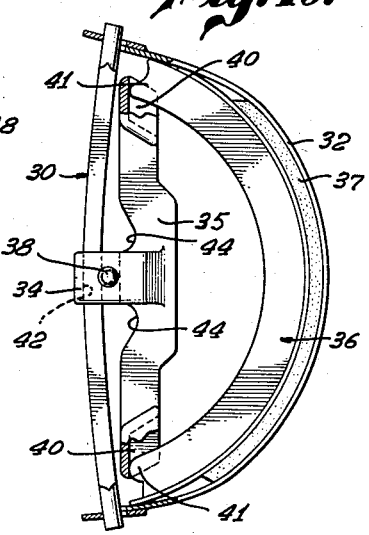
INVENTOR.
MARVIN E. GREEN,
BY
Paul A. Weilein
ATTORNEY.

United States Patent Office 2,837,139
Patented June 3, 1958

2,837,139

CLAMP FOR HOLDING BRAKE LINING IN POSITION TO BE BONDED TO A BRAKE SHOE

Marvin E. Green, Los Angeles, Calif.

Application October 22, 1953, Serial No. 387,606

5 Claims. (Cl. 154—1)

This invention relates to apparatus for facilitating the bonding of brake lining to brake shoes by means of a thermo-setting adhesive.

It is an object of this invention to provide a novel clamp which will maintain the desired uniform clamping pressure throughout the brake lining in the operation of applying the lining as well as during the application of heat for bonding the lining to the shoe.

Another object of this invention is to provide a clamp such as described which may be quickly and easily applied and maintained under tension without distortion of the shoe.

It is an additional object hereof to provide novel apparatus by means of which the clamp may be quickly, easily and accurately applied to hold the lining in place under a constant spring pressure.

Further, it is an object hereof to provide a spring loaded clamp such as described, wherein a novel spring means will maintain a flexible band under the desired tension against the lining without being ill effected or failing in the application of the desired force under the heat to which the shoe and clamp are subjected to bond the lining to the shoe.

Another object hereof is the provision of a brake shoe clamp such as described which is comparatively small, compact and takes up but little more space than the shoe itself.

A further object hereof is the provision of a clamp which apart from the flexible band for holding the lining on the shoe, consists of but two simply constructed parts comprising a rigidly body to engage the brake shoe and a spring engaged with the body so that it may be flexed relative thereto for tensioning the flexible band.

This invention possesses other advantages and has other objects which will be apparent from a consideration of the embodiments thereof shown in the drawing accompanying and forming part of the present specification. These embodiments will now be described in detail, illustrating the general principles of the invention; but it is to be understood that this detailed description is not to be taken in a limiting sense, since the scope of the invention is best defined by the appended claims.

Referring to the drawings:

Fig. 1 is a top plan view, partly in section, of apparatus and a clamp embodying the present invention, showing the clamp parts and the apparatus in position to apply the clamp to a brake shoe;

Fig. 2 is a fragmentary sectional view taken on the plane of line 2—2 of Fig. 3;

Fig. 3 is a plan view of the apparatus and clamp shown partly in section, as they would appear after flexing the bowed spring and attaching the band to the spring;

Fig. 4 is a top plan view, partly in section, showing the shoe with the clamp thereon as when removed from the applying apparatus and ready to be subjected to heat for bonding the lining to the shoe;

Fig. 5 is a fragmentary sectional view taken on the plane of line 5—5 of Fig. 3;

Fig. 6 is a top plan view, partly in section, of a modified form of clamp and applying apparatus embodying the present invention, showing the clamp and apparatus as when ready to tension the clamp on a brake shoe;

Fig. 7 is a view similar to Fig. 6, showing the modified clamp and apparatus as when the clamp is applied to the shoe;

Fig. 8 is an enlarged fragmentary sectional view taken on the line 8—8 of Fig. 6;

Fig. 9 is a sectional view similar to Fig. 8 taken on the line 9—9 of Fig. 7; and Fig. 10 is a plan view, partly in section, of the shoe and clamp as when removed from the clamp applying apparatus.

As shown in Figs. 1–5 of the accompanying drawing, a clamp made in accordance with the present invention generally includes a rigid body 1 and a spring 2 related to the body so as to be flexed relative thereto after the flexible band 3 has been applied to embrace a brake shoe 4 to hold thereon the brake lining 5 to be bonded to the shoe.

The shoe is adapted to be supported on a table 6 vertically adjustably mounted on a base structure 7, on which latter power operated apparatus 8 is supported for operation to flex the spring 2.

When the apparatus 8 has been operated to flex the spring, the ends of the band 3 are detachably connected with the ends of the spring 2 after which the apparatus 8 is operated to remove the flexing pressure, whereupon the spring will exert a force through the band to uniformly clamp the lining against the shoe 4. Next the clamp and shoe are removed from the apparatus 8 and placed in an oven, not shown, or otherwise subjected to heat according to conventional practice to bond the lining to the shoe.

Referring more specifically to the clamp, it will be seen that the rigid body 1 thereof, as here shown, is in the form of a solid steel bar having its ends formed with channels or recesses 1a adapted to embrace the ends of the arcuate rib 4a of the brake shoe 4. These recesses or channels 1a make it possible to apply the body to the ribs of brake shoes of different sizes.

The spring 2 in the form of the invention shown in Figs. 1–5, is made of a solid, resilient steel bar of rectilinear cross section which is bowed and formed with somewhat rounded ends 2a adapted for engagement with the apertured and suitably reinforced ends 3a of the flexible band 3. This spring is arranged so that the convex side thereof is engaged with the body 1 whereby the spring may be flexed relative to the body. As here shown, the body 1 is provided with an integral eye or clevis 9 embracing the spring to connect it with the body. The non-circular cross section of the spring and the conforming shape of the eye 9 restrain the spring against angular movement about its axis. However, the spring may be axially adjusted in the eye 9 to position the ends of the spring for connection with clamping bands applied to brake shoes of different sizes.

The power operated apparatus 8, as here shown, includes an upstanding, rigid pressure-applying member 12 (see Fig. 2) fixed on the base 7 to contact the central portion of the side of the body 1 opposite the side on which the spring is mounted. A flange 12a on the member 12 prevents upward movement of the body 1 out of contact with the member 12 during the flexing of the spring 2. The table 6 is relieved at 6a to accommodate the pressure-applying member 12 and is supported on a post 14 vertically adjustable in an opening 15 in the base, being held in adjusted position by a set screw 16. By means of this adjustment of the table the brake shoe may be disposed in alignment with the clamp.

The power operated apparatus also includes a pneumatic ram having its cylinder 17 fixed to the base and its piston rod 18 extended toward the table 6. An elongated pressure-applying head 19 is fixed between its ends on the outer end of the rod 18. The end portions of this head are disposed to engage end portions of the bowed spring 1 so as to flex the spring upon advance of the head. The head is slidably guided on opposed upstanding walls or members 20 integral with the base 7, which also support the body 1 and spring 2.

Compressed air is applied to the cylinder 17 from a suitable source, not shown, through a pipe line 23 leading into the rear of the cylinder behind the piston 24. Any suitable valve means, not shown, may be employed to control the supply of air to the cylinder 17 and to relieve the air therefrom. A pressure gauge 26 is provided in the pipe line 23, whereby the operator may determine the pressure for effecting the desired flexing of the spring 2.

Operation

With the brake shoe 4 positioned on the table 6 as shown in Fig. 1, the lining 5 is placed with the side thereof bearing the thermo-setting adhesive against the shoe. Next the body 1 of the clamp is placed against the stop member 12 so that the ends of the rib 4a are positioned in the channelled ends 1a of the body 1, the body thereby spanning the concave side of the shoe. The spring 2 may be adjusted axially according to the size of the shoe to position the rounded ends 2a so that the band 3 may be connected thereto.

With the parts of the clamp positioned as shown in Fig. 1, the operator actuates the pneumatic ram so that the head 19 will engage and flex the spring 2 for example, to the extent shown in Fig. 3, whereupon the operator moves the band 3 around the shoe over the lining and hooks the apertured ends 3a over the ends 2a of the spring, thereby causing the band to embrace the lining and the brake shoe as shown in Fig. 3.

Next, the flexing pressure against the spring 2 is relieved by exhausting the air from the cylinder 17. Upon the release of the flexing pressure, the spring 2 will clamp the band against the lining and maintain the band under tension such that uniform pressure is maintained throughout the lining. The head 19 is now retracted, whereby the clamp and shoe as a unit may be removed from the table 6 and placed in an oven or otherwise heated to bond the lining to the shoe.

After the bonding operation, the clamp may be removed from the shoe by placing the shoe and clamp on the table 6 and applying pressure by means of the pneumatic ram and head 19 to flex the spring to the position whereby the band may be readily removed and the clamp withdrawn from engagement with the rib 4a of the shoe.

It is important to note that the simply constructed and compact clamp as here provided, makes it possible to bond the lining on a shoe in less time and with greater ease and accuracy than heretofore. Moreover, in having the clamp applied against the arcuate rib of the shoe, all possibility of distorting and damaging the shoe as heretofore occasioned in this art is eliminated.

A modified form of this invention, as shown in Figs. 6–10, embodies a clamp and apparatus for applying the clamp which are similar to the clamp and applying apparatus shown in Figs. 1–5, but differ therefrom primarily in the use of a normally straight spring bar 30 in the clamp and in the manner in which this spring bar is flexed and thereafter held in flexed position by a releasable locking means.

In this modified form of the clamp, the straight spring bar 30 is flexed while engaged with stationary pressure applying means 31 after the ends of the flexible band 32 have been connected with the ends of the spring bar. In this flexing of the spring bar 30, a movable pressure applying member in the form of the piston 33 of a pneumatic ram (not shown) corresponding to the ram shown in Figs. 1–5, is moved against the spring bar-supporting projection 34 on the rigid body 35 of the clamp so that the clamp and brake shoe 36 as a unit are moved in a direction causing the spring bar to be flexed for example, from the position shown in Fig. 6 to the position shown in Fig. 7.

When the spring bar 30 is flexed in this manner, the band 32 applies the spring pressure to the brake lining 37 on the shoe 35. This pressure is uniform throughout the lining and is maintained by holding the spring bar in flexed position by use of the aforesaid locking means, here shown as a pin 38 insertible through openings 39 in the spring bar-supporting projection 34. When this pin is inserted, it will restrain the spring bar 30 from springing back to its normal position, thereby maintaining the band 32 under a constant spring pressure which assures that the brake lining will be uniformly bonded to the shoe when the shoe and the clamp as a unit are subjected to heat according to the established practice in this art. During the application of the bonding heat, the spring pressure will compensate for any differential in thickness of the lining caused by the heat and pressure and cause a "live" and uniform spring pressure to be applied throughout the lining, thereby assuring a reliable bonding of the lining to the shoe.

Referring more specifically to the modified form of this invention, as shown in Figs. 6–10, it will be seen that rigid body 35 of the clamp is provided with recessed ends 40 for reception of the ends of the rib 41 of the shoe in the same manner as in the body 1 of the first described form of this invention. The spring bar-supporting projection 34 corresponds to the eye or clevis 9 in the first described form, but is shown somewhat longer and adapted to be engaged by the piston 33. This projection has an elongated slot 42 therein for reception of the spring bar 30 and which provides for movement of the bar between the ends of the slot in the flexing of the bar. The pin receiving openings 39 are disposed so that the pin 38 will hold the spring bar in the end of the slot 42 farthest removed from the body 35 when the spring is flexed as shown in Fig. 7, thereby preventing the spring from springing back into the straight position shown in Fig. 6.

The band 32 is identical with the band 3 in the first described form of the invention and is applied to ends of the spring bar 30 as shown in Fig. 6, before this bar is flexed.

The force applying apparatus is substantially the same as that shown in Figs. 1–5, except that the base 43 thereof provides the stationary force applying means 31 in the form of a pair of upstanding rigid pins or studs 31a adapted to be positioned between the body 35 and the spring bar 30 as shown in Fig. 6. To accommodate this positioning of the lugs 31a, the body is provided with recesses 44 on opposite sides of the projection 34.

Upstanding guide members or walls 45 on opposite sides of the base 43 are adapted to slidably support the clamp for application to the brake shoe. A portion 46 on the base between the members 45 supports the studs or pins 31a and provides a surface on which the clamp and piston are slidably supported. A groove 47 is formed in the member 46 between the lugs 31a to accommodate the locking pin 38 as shown in Fig. 9.

A vertically adjustable table 48 for supporting the brake shoe in position for application thereto of the clamp, is mounted on the base 43 and operated in the same manner as the table 6 shown in Figs. 1 and 2.

It should be noted that in this form of the invention the locking pin 38 may be knocked out of place to release the clamp for removal thereof from the shoe after the bonding operation.

I claim:

1. A device for holding brake lining in position to be bonded to the convex surface of an arcuate brake shoe comprising: an elongated body for spanning the concave side of such a brake shoe; means on the ends of said body for engaging ends of said shoe to hold the shoe and body against relative movement; a resilient bar of greater length than said body; mounting means between the ends of said body supporting said bar alongside said body for flexure relative thereto with the ends of the bar disposed beyond the ends of said shoe; a base structure for supporting said body and shoe; a flexible band for holding the brake lining on the shoe; said band having its ends extended beyond the ends of the shoe; means on said ends of said band for connecting said band with said ends of said bar; and force applying means operable on said base structure for flexing said bar; said force applying means being disposed to engage portions of said bar on opposite sides of said mounting means.

2. A device for holding brake lining in position to be bonded to the convex surface of an arcuate brake shoe comprising: an elongated body for spanning the concave side of such a brake shoe; means on the ends of said body for engaging ends of said shoe to hold the shoe and body against relative movement; a resilient bar of greater length than said body; mounting means between the ends of said body supporting said bar alongside said body for flexure relative thereto with the ends of the bar disposed beyond the ends of said shoe; a base structure for supporting said body and shoe; a flexible band for holding said lining on the shoe; said band having its ends extended beyond the ends of the shoe; means on said ends of said band for connecting said band with said ends of said bar; and force applying means operable on said base structure for flexing said bar; said force applying means including a movable member engageable with said mounting means; and a stationary members disposed between said bar and said body engaging said bar on opposite sides of said mounting means.

3. A device for holding brake lining in position to be bonded to the convex surface of an arcuate brake shoe comprising: an elongated body for spanning the concave side of such a brake shoe; means on the ends of said body for engaging ends of said shoe to hold the shoe and body against relative movement; a resilient bar of greater length than said body; a projection intermediate the ends of said body having an opening therein in which said bar is mounted for movement relative to said projection; said bar extending alongside said body with its ends disposed beyond the ends of said shoe; a base structure for supporting said shoe and said body; a flexible band for holding the lining on said shoe; means on the ends of said band for connecting said band with said ends of said bar; a movable force-applying member on said base structure engageable with said projection for moving said body; and stationary members on said base structure disposed between said body and said bar on opposite sides of said projection for engaging and flexing said bar responsive to movement of said body by said movable force applying member.

4. A device for holding brake lining in position to be bonded to the convex surface of an arcuate brake shoe comprising: an elongated body for spanning the concave side of such a brake shoe; means on the ends of said body for engaging ends of said shoe to hold the shoe and body against relative movement; a resilient bar of greater length than said body; a projection intermediate the ends of said body having an opening therein in which said bar is mounted for movement relative to said projection; said bar extending alongside said body with its ends disposed beyond the ends of said shoe; a base structure for supporting said shoe and said body; a flexible band for holding the lining on said shoe; means on the ends of said band for connecting said band with said ends of said bar; a movable force-applying member on said base structure, engagable with said projection for moving said body; and stationary members on said base structure extending between said body and said bar on opposite sides of said projection for engaging and flexing said bar responsive to movement of said body by said movable force applying member; said projection having a pin-receiving opening therein; and a pin insertable into said pin-receiving opening to engage and hold said bar against movement relative to said projection.

5. A device for holding brake lining in position to be bonded to the convex surface of an arcuate brake shoe comprising: an elongated body for spanning the concave side of such a brake shoe; means on the ends of said body for engaging ends of said shoe to hold the shoe and body against relative movement; a normally bowed resilient bar of greater length than said body; a projection intermediate the ends of said body having an opening therein through which said bar is inserted so as to lie alongside said body with its ends disposed beyond the ends of said shoe; and a flexible band for holding the lining on the shoe; said band having openings in the ends thereof through which the ends of said bar are extensible when said bar has been flexed relative to said body so that the ends of said bar are moved toward the ends of said shoe; a base structure on which said shoe and body are supported; and force-applying means on said base operable to engage said bar on opposite sides of said projection.

References Cited in the file of this patent

UNITED STATES PATENTS

| | | |
|---|---|---|
| 261,610 | Howe | July 25, 1882 |
| 1,275,377 | Buckley | Aug. 13, 1918 |
| 1,475,487 | Hammond | Nov. 27, 1923 |
| 1,846,157 | Stevens | Feb. 23, 1932 |
| 1,926,022 | Barrett | Sept. 12, 1933 |
| 2,009,046 | Fons | July 23, 1935 |
| 2,455,341 | Saunders | Nov. 30, 1948 |
| 2,523,507 | Langford et al. | Sept. 26, 1950 |
| 2,589,036 | Bender | Mar. 11, 1952 |